United States Patent
Liu et al.

(10) Patent No.: US 12,151,648 B2
(45) Date of Patent: Nov. 26, 2024

(54) SECURITY ARCHITECTURE FOR A REAL-TIME REMOTE VEHICLE MONITORING SYSTEM

(71) Applicant: TUSIMPLE, INC., San Diego, CA (US)

(72) Inventors: Jiaqi Liu, San Diego, CA (US); Ruiliang Zhang, San Diego, CA (US); Xiaoling Han, San Diego, CA (US); Lindong Sun, San Diego, CA (US); Liu Liu, San Diego, CA (US); Yi Wang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 641 days.

(21) Appl. No.: 17/255,998

(22) PCT Filed: Jun. 20, 2019

(86) PCT No.: PCT/US2019/038332
§ 371 (c)(1),
(2) Date: Dec. 23, 2020

(87) PCT Pub. No.: WO2020/005722
PCT Pub. Date: Jan. 2, 2020

(65) Prior Publication Data
US 2021/0221332 A1    Jul. 22, 2021

Related U.S. Application Data

(60) Provisional application No. 62/689,720, filed on Jun. 25, 2018.

(51) Int. Cl.
*B60R 25/30* (2013.01)
*B60R 25/102* (2013.01)
(Continued)

(52) U.S. Cl.
CPC .......... *B60R 25/307* (2013.01); *B60R 25/102* (2013.01); *B60R 25/32* (2013.01);
(Continued)

(58) Field of Classification Search
CPC ..... B60R 25/307; B60R 25/102; B60R 25/32; B60R 25/33; B60R 2325/108;
(Continued)

(56) References Cited

U.S. PATENT DOCUMENTS

| | | | |
|---|---|---|---|
| 4,497,057 A | 1/1985 | Kato et al. | |
| 6,311,274 B1* | 10/2001 | Day | G06F 21/554 709/224 |

(Continued)

FOREIGN PATENT DOCUMENTS

| | | |
|---|---|---|
| CN | 107948307 A1 | 4/2018 |
| KR | 20070090420 A1 | 9/2007 |

(Continued)

OTHER PUBLICATIONS

CN107948307A; translation to English; Zuo et al., an intelligent vehicle-mounted device, p. 1 to 17; Apr. 20, 2018 (Year: 2018).*

(Continued)

*Primary Examiner* — Nam V Nguyen
(74) *Attorney, Agent, or Firm* — Perkins Coie LLP (57) ABSTRACT

Disclosed are devices, systems and methods for securing wireless communications between a remote monitor center and a vehicle by using redundancy measures to increase the robustness of the system. In some embodiments, a system may include redundant communication channels, deploy redundant hardware and software stacks to enable switching to a backup in an emergency situation, and employ hypervisors at both the remote monitor center and the vehicle to monitor hardware and software resources and perform integrity checks. In other embodiments, message digests based on (Continued)

a cryptographic hash function and a plurality of predetermined commands are generated at both the remote monitor center and the vehicle, and compared to ensure the continuing integrity of the wireless communication system.

20 Claims, 7 Drawing Sheets

(51) Int. Cl.
| | |
|---|---|
| *B60R 25/32* | (2013.01) |
| *B60R 25/33* | (2013.01) |
| *G06F 21/55* | (2013.01) |
| *G06F 21/57* | (2013.01) |
| *G06F 21/60* | (2013.01) |
| *H04L 9/32* | (2006.01) |
| *H04W 4/40* | (2018.01) |
| *H04W 4/80* | (2018.01) |
| *H04W 4/90* | (2018.01) |
| *H04W 12/106* | (2021.01) |
| *H04W 12/108* | (2021.01) |

(52) U.S. Cl.
CPC ............ *B60R 25/33* (2013.01); *G06F 21/554* (2013.01); *G06F 21/577* (2013.01); *G06F 21/606* (2013.01); *H04L 9/3239* (2013.01); *H04W 4/40* (2018.02); *H04W 4/80* (2018.02); *H04W 4/90* (2018.02); *H04W 12/106* (2021.01); *H04W 12/108* (2021.01); *B60R 2325/108* (2013.01); *H04L 2209/80* (2013.01); *H04L 2209/84* (2013.01)

(58) Field of Classification Search
CPC .... G06F 21/554; G06F 21/577; G06F 21/606; G06F 21/57; G06F 21/64; H04L 9/3239; H04L 2209/80; H04L 2209/84; H04W 4/40; H04W 4/80; H04W 4/90; H04W 12/106; H04W 12/108; H04W 4/44; G07C 5/008; G07C 5/0808; B32B 19/08
USPC ............................... 340/5.3, 5.86, 7.22, 7.44
See application file for complete search history.

(56) References Cited

U.S. PATENT DOCUMENTS

| | | | |
|---|---|---|---|
| 6,381,698 B1* | 4/2002 | Devanbu | G06F 21/51 |
| | | | 713/181 |
| 7,856,558 B2* | 12/2010 | Martin | G07C 9/257 |
| | | | 340/5.82 |
| 8,069,346 B2* | 11/2011 | Struik | H04L 9/3252 |
| | | | 713/171 |
| 10,354,265 B2* | 7/2019 | Patsiokas | G06Q 30/0261 |
| 10,728,249 B2* | 7/2020 | Markham | H04L 63/02 |
| 10,733,160 B1* | 8/2020 | Leise | G06F 16/2255 |
| 10,911,484 B2* | 2/2021 | Hobe | H04L 63/0272 |
| 10,922,303 B1* | 2/2021 | Bruck | G06F 16/2365 |
| 11,019,042 B1* | 5/2021 | Chang | H04L 63/045 |
| 2010/0159868 A1 | 6/2010 | Seymour | |
| 2011/0235627 A1 | 9/2011 | Wang | |
| 2015/0006005 A1 | 1/2015 | Yu et al. | |
| 2015/0295638 A1 | 10/2015 | Keremedjiev | |
| 2015/0334545 A1 | 11/2015 | Maier | |
| 2016/0366109 A1 | 12/2016 | Lablans | |
| 2017/0031592 A1 | 2/2017 | More et al. | |
| 2017/0308098 A1 | 10/2017 | Yu et al. | |

FOREIGN PATENT DOCUMENTS

| | | |
|---|---|---|
| WO | 2017096596 A1 | 6/2017 |
| WO | 2018029905 A1 | 2/2018 |

OTHER PUBLICATIONS

Veshi, Erzim. European Patent Application No. 19826636.3, Partial Supplementary European Search Report Mailed Feb. 8, 2022, pp. 1-16.
Veshi, Erzim. European Patent Application No. 19826636.3, Extended European Search Report Mailed May 11, 2022, pp. 1-13.
Shane Thomas, International Application No. PCT/US2019/038332 International Search Report and Written Opinion, Mailed Oct. 25, 2019. p. 1.
Australian Patent Office, 1st Examination Report for Australian Patent Appl. No. 2019295577, mailed Sep. 18, 2023, 6 pages.
Chinese Patent Office, 2nd Office Action & Search Report for CN Appl. No. 201980042567.6, mailed Sep. 29, 2023, 7 pages.
Examination Report from corresponding AU Patent Application No. 2019295577, dated Nov. 21, 2023, (3 pages).

* cited by examiner

SECURITY ARCHITECTURE FOR A REAL-TIME REMOTE VEHICLE MONITORING SYSTEM

CROSS-REFERENCE TO RELATED APPLICATIONS

This patent document is a National Stage of International Application No. PCT/US19/38332, entitled "SECURITY ARCHITECTURE FOR A REAL-TIME REMOTE VEHICLE MONITORING SYSTEM" filed on Jun. 20, 2019 which claims priority to and benefits of U.S. Provisional Patent Application No. 62/689,720 entitled "SECURITY ARCHITECTURE FOR A REAL-TIME REMOTE VEHICLE MONITORING SYSTEM" filed on Jun. 25, 2018. The entire contents of the aforementioned patent applications are incorporated by reference as part of the disclosure of this patent document.

TECHNICAL FIELD

This document relates to vehicle monitoring and control.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services.

SUMMARY

Disclosed are devices, systems and methods for securing wireless communications between a remote monitor center and a vehicle. This may be achieved by using redundancy measures to increase the robustness of the system. For example, embodiments of the disclosed technology may use redundant communication channels, deploy redundant hardware and software stacks to enable switching to a backup in an emergency situation, and employ hypervisors at both the remote monitor center and the vehicle to monitor hardware and software resources and perform integrity checks.

In one aspect, the disclosed technology can be used to implement a method for providing security for a vehicular monitoring system. This method includes generating a first message digest that is an output of a cryptographic hash function with an input that is a plurality of predetermined commands sent to the vehicle, receiving, from the vehicle, a second message digest that is an output of the cryptographic hash function with an input that is a plurality of predetermined commands received by the vehicle, comparing the first message digest and the second message digest to determine whether the first message digest is identical to the second message digest, and generating an indicator for a security breach at least when the first message digest is different from the second message digest.

In another aspect, the disclosed technology can be used to implement a method for providing security for a vehicular monitoring system. This method includes periodically performing an integrity check on a software stack associated with control or operation of a vehicle, and replacing the software stack with a new version of the software stack from a backup software system at least when a failure of the integrity check is determined.

The above and other aspects and features of the disclosed technology are described in greater detail in the drawings, the description and the claims.

DETAILED DESCRIPTION

A communication link between a vehicle and remote monitor center, if unprotected, is vulnerable to cyber-attacks. The damage caused by a successful attack on a vehicular monitoring system may range from mild to disastrous—to the extent of serious casualties and property losses. Current approaches fall short in two aspects; a lack of high availability guarantee, and the inability to defend against physical attacks and/or threats. To enforce the security objectives for deployed and developing vehicular monitoring systems, embodiments of the disclosed technology include a stack of security mechanisms, which can protect the information and resources of remote monitoring and control systems.

Embodiments of the disclosed technology, as described in this document and in the context of the Figures and Claims, may provide one or more of the following advantages.

(1) Authenticity of the communication parties;
(2) Authenticity, integrity and secrecy of remote monitoring and control messages;
(3) Integrity of the system components;
(4) High availability of a communication link; and
(5) Safe handling in failure or emergency situations.

Figure 1:
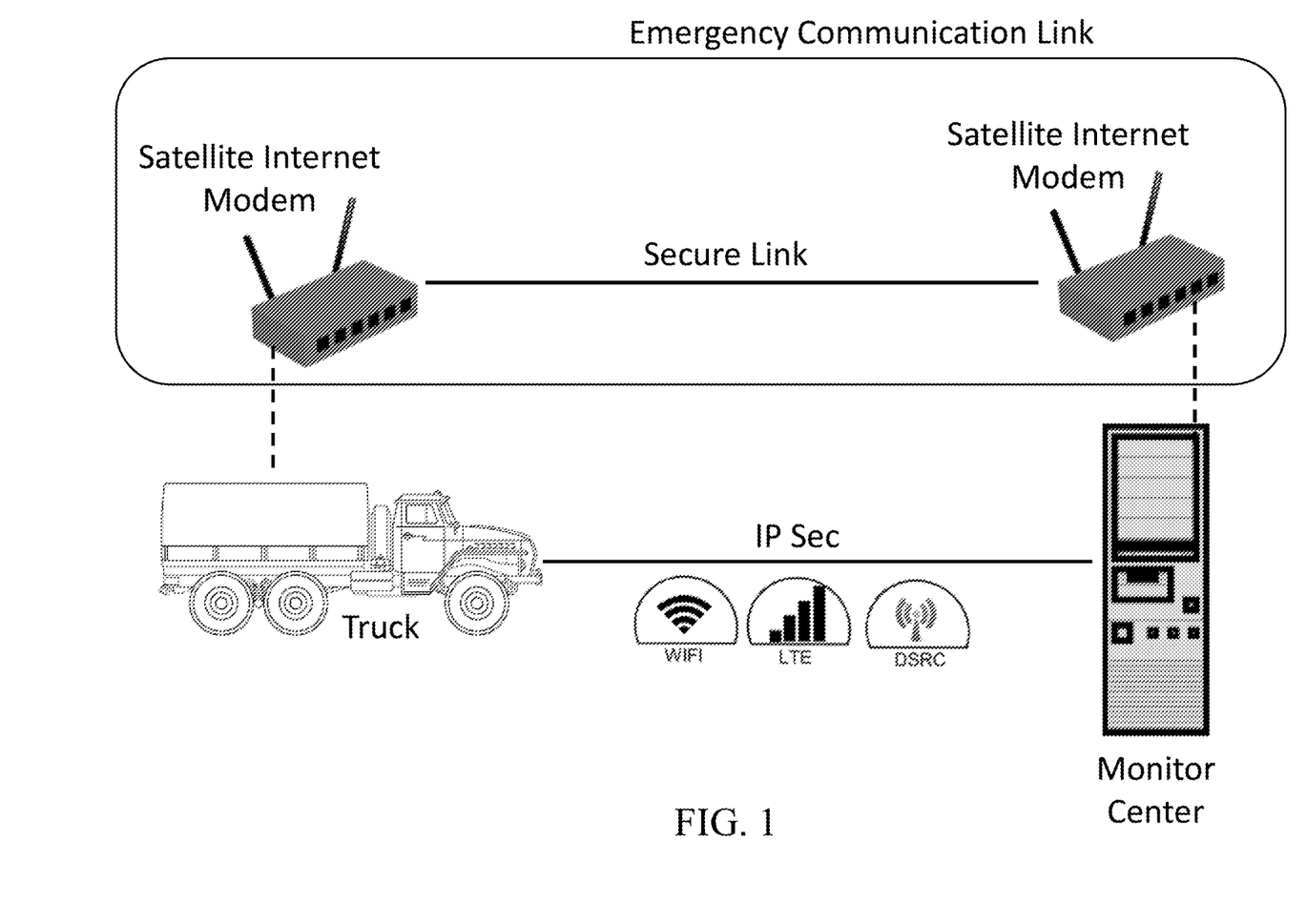
FIG. 1 shows a block diagram of an exemplary security architecture for a real-time remote vehicular monitoring system.

FIG. 1 shows a block diagram of an exemplary security architecture for a real-time remote vehicular monitoring system. As shown in FIG. 1, a vehicle (or in an embodiment, a truck, or the electronic control unit (ECU) of the truck) may communicate with a remote monitor center via redundant links. In some embodiments, the data (or operational) link is used for the bulk transfer of operation data, and may be implemented using a Wi-Fi, a 4G-LTE (4th Generation Long Term Evolution) or a Dedicated Short Range Communications (DSRC) link protocol. The alternate link is an emergency channel that may be implemented with a satellite link. In some embodiments, the emergency channel may be reserved for remote control of the vehicle under emergency situations. In an example, an emergency situation may be an adverse environment (e.g. a total loss of signal) or the presence of an attacker (e.g. an integrity check failure).

Embodiments of the disclosed technology include various components that enable providing security to a real-time remote vehicular monitoring system. These components include one or more of (1) secure communication between the vehicle and the remote monitor center that are essential for secure transmission of control commands, (2) platform integrity checks at both the vehicle and the remote monitor center to ensure continuously safe operation, (3) redundant wireless communication links that provide high availability, (4) emergency handling services that protect against adverse circumstances, and (5) command feedback validation to ensure authenticity of the commands. Various aspects, features and implementations of these components are described in this document.

Secure Communication: In some embodiments, the operational link may be secured using an Internet layer cryptographic protocol, which enforces authenticity, integrity and secrecy. In an example, the operational link may use the Internet Protocol security (IPsec) protocol. The emergency channel may be secured using a low-latency Application layer cryptographic protocol, due to the imperative nature of emergency communications. In an example, the Secure Sockets Layer (SSL) protocol or the Transport Layer Security (TLS) protocol may be used for the emergency channel, which does not require explicit client authentication after an initial authentication process.

Platform Integrity Checks: In some embodiments, periodic integrity checks may be used for safe operation assurances. For example, continuous success of integrity checks for the vehicle, the in-vehicle systems and the remote monitor center indicate that the systems are operating in a safe state. On the other hand, if any of the integrity checks fail, the system may invoke emergency handling routines.

In some embodiments, the state of the vehicle may be defined using one or more of the following aspects: position, velocity, acceleration, availability of human operator, traffic conditions, and the driving environment. In other embodiments, the state of the in-vehicle system may be defined by the operational condition of the in-vehicle sensors, the hardware systems and the software systems. In yet other embodiments, the state of the remote monitor center may be defined by the operational condition of the hardware and software systems.

Figure 2:
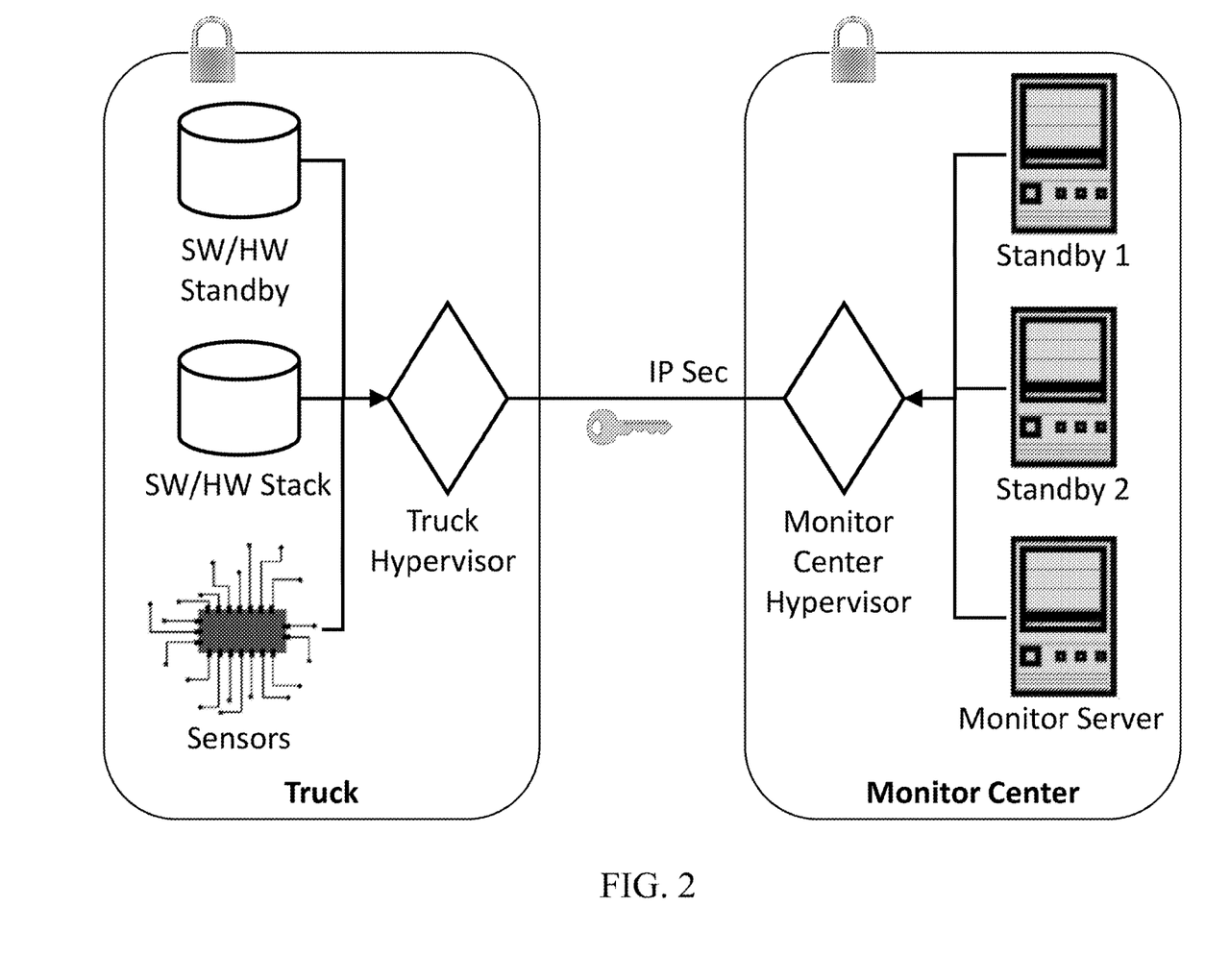
FIG. 2 shows a block diagram highlighting the redundancy aspect of another exemplary security architecture for a real-time remote vehicular monitoring system.

FIG. 2 shows a block diagram of another exemplary security architecture for a real-time remote vehicular monitoring system, which highlights the utility of a redundant systems for integrity checking. In some embodiments, software and hardware systems are replicated in both the vehicle and the remote monitor center to provide robustness against faults.

As shown in FIG. 2, a hypervisor-style architecture is deployed in both the vehicle and the remote monitor center in order to monitor the healthiness of the entire system. In this framework, it is assumed that hypervisors are the root of trust and should be maintained and secured in a trustworthy manner. As shown on the vehicle (or truck) side, the "SW/HW stack" is the system currently being used and checked, whereas the "SW/HW Standby" is the backup system. Similarly, the "Monitor Server" is the operational instance on the remote monitor center side, whereas "Standby 1" and "Standby 2" are backup options. In some embodiments, and as shown in FIG. 2, the remote monitor center may include a plurality of monitor servers. In other embodiments, the plurality of monitor servers may be implemented as a single server with multiple copies stored in the cloud or some other storage medium.

During normal operation, the truck hypervisor continuously verifies the integrity of truck system (one or more of the SW/HW stack, the SW/HW stand-by and the sensors), and the monitor center hypervisor verifies the integrity and liveness of monitor servers. In an example, the truck and remote monitor server hypervisors communicate over the operational link that is secured using the IPsec protocol.

Depending on the type of failure detected by the hypervisors, the different actions that may be undertaken are enumerated in Table 1.

TABLE 1

Routines undertaken by Hypervisors based on Failures Detected

| Failure Detected | Action Undertaken |
|---|---|
| Truck SW/HW stack is tampered | Truck hypervisor discards the current stack, yields control to the SW/HW Standby, and notifies the remote monitor center |
| Truck SW/HW Standby is tampered | Truck hypervisor invokes Emergency Handling Routine (EHR) |
| Inconsistent sensor data detected | Implement error correction mechanism or discard unreliable source of data (if available), otherwise invoke EHR |
| Current Monitor Server is tampered | A new healthy Standby monitor center is selected, and operation personnel are notified |

Redundancy: Embodiments of the disclosed technology implement redundancy in many aspects to ensure the robust performance of the real-time remote vehicular monitoring system. As described in this document, redundant communication links are deployed in the form of the operational channel and the emergency channel. In another aspect, the operational channel may use a variety of different protocols.

In addition to communication redundancy, embodiments of the disclosed technology include hardware and software redundancies as discussed in this document. In an example, one or more of the sensors, the battery, the electronic control units (ECUs) and the monitor servers may be replicated to provide robustness against faults.

In some embodiments, two copies of at least one control command are received using two different wireless communication protocols, and are compared. The at least one control command is executed when the two copies are in agreement, but is rejected when the two copies differ. In other embodiments, additional wireless communication protocols may exist to provide a redundant mode of communication when one of the two different wireless communication protocols are unavailable. In yet other embodiments, redundant GPS units may be used to determine availability of any of the communication protocols, and relevant control commands may be downloaded in advance to circumvent the lack of coverage.

Figure 3:
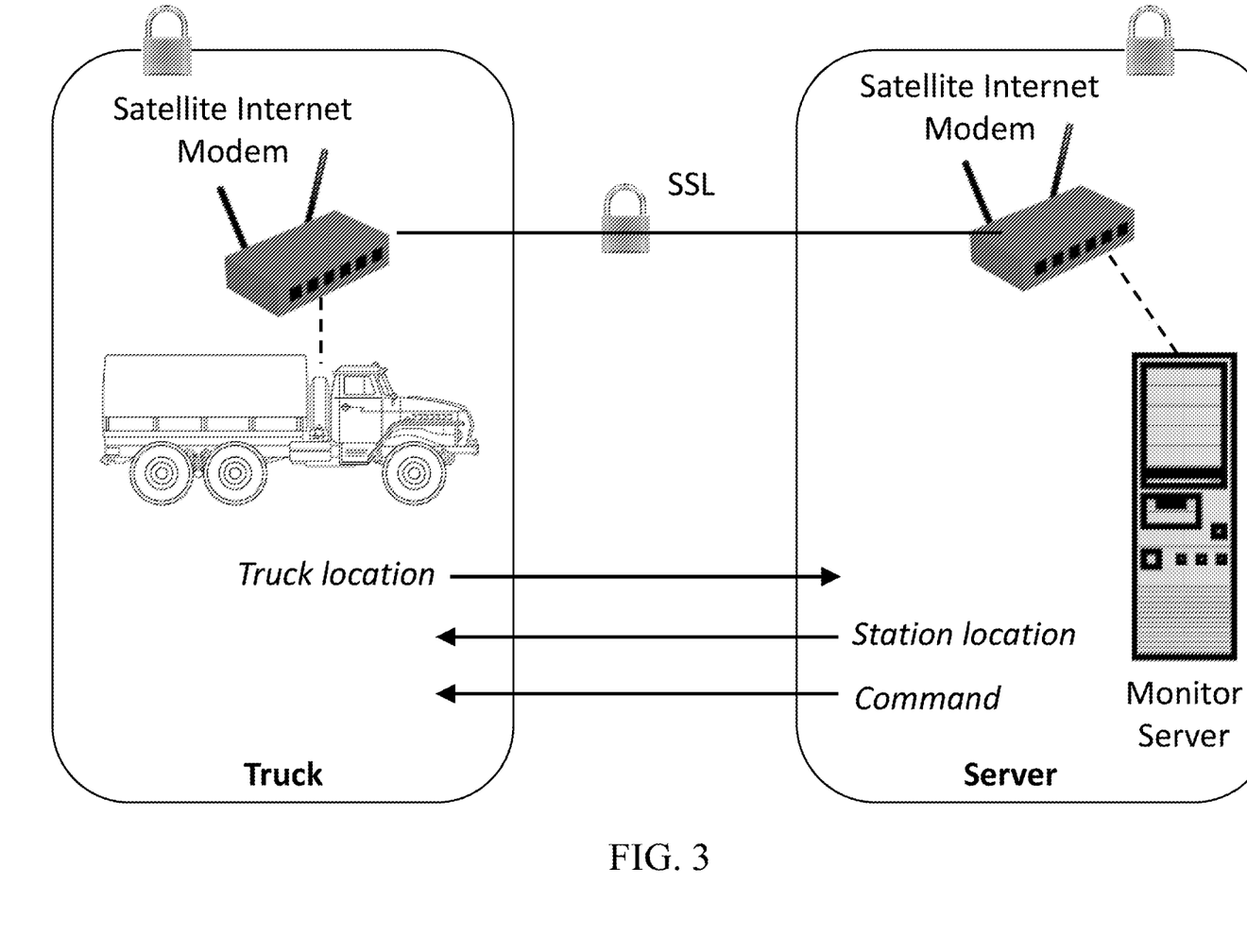
FIG. 3 shows a block diagram of an exemplary emergency handling system that is used in providing security in a real-time remote vehicular monitoring system.

Emergency Handling System (EHS): In some embodiments, the EHS can include an emergency communication link (ECL) and an emergency handling routine (EHR). FIG. 3 shows a block diagram of an exemplary EHS that may be used in providing security in a real-time remote vehicular monitoring system. In other embodiments, the emergency link may be configured to provide constant and consistent availability of the communication link, as is possible given the available resources. However, the availability should not come at the expense of security, as an attacker could take advantage of the simplicity of an exemplary failure handling protocol and navigate the vehicle to arbitrary locations.

As shown in FIG. 3, the emergency communication channel may be implemented with satellite Internet. Due to the immediate and time-sensitive nature of emergency messages, the emergency channel may be secured with a low-latency security protocol, e.g. SSL/TLS, in order to reduce delays in the transmission and reception of the emergency messages.

In an example, and when a failure is detected, the vehicle may initialize an emergency communication with the remote monitor center to report its geolocation. In some embodiments, the geolocation may include geographic coordinates (e.g. longitude and latitude). In other embodiments, the geolocation may further include street addresses, landmarks or mile markers. In yet other embodiments, the geolocation may include an approximate location derived using base stations and/or Wi-Fi hotspots (instead of a more precise location derived using GPS).

In some embodiments, and based on the geolocation information, the remote monitor server selects a nearest service station or exit (if the vehicle is on a highway), and navigates the vehicle to safely exit its current environment. In other embodiments, operation personnel are also informed of the EHRs being currently undertaken.

In some embodiments, a vehicle may perform self-tests, generate a report based on the results, and transmit it to a remote monitor center over one or both of a high-speed channel for regular data transfers or a reliable channel for emergency situations. In other embodiments, the remote monitor center may determine that immediate intervention is required, and may transmit a control command with high priority, which when received by the vehicle, is implemented and overrides any local commands being processed. In yet other embodiments, the control command with high priority is selected from a small group of predetermined control commands the remote monitor center may issue.

In some embodiments, the real-time remote vehicular monitoring system may be configured to account for various operational factors and conditions. In an exemplary case, many normal environmental factors can cause signal loss for a non-negligible period of time, e.g. a vehicle entering a tunnel may lose wireless connectivity for a prolonged period of time, but this situation should not be deemed an emergency.

In order to distinguish between these two scenarios, a signal loss time threshold may be established. In some embodiments, the threshold may be predetermined based on the longest tunnel known to exist on the route the vehicle is scheduled to travel on. Thus, signal faults within that threshold of time are reported to the remote monitor center, but do not trigger the EHS.

Command Feedback Validation: Embodiments of the disclosed technology may include the remote monitor center issuing several types of control commands to the vehicle, and in this case, ensuring the integrity of the commands is critical. In some scenarios, an attacker may inject commands from covers channels (not protected channels, e.g. 4G-LTE), and ensuring the authenticity of commands sent from the remote monitor center and received at the vehicle will protect against just such an attack.

Figure 4:
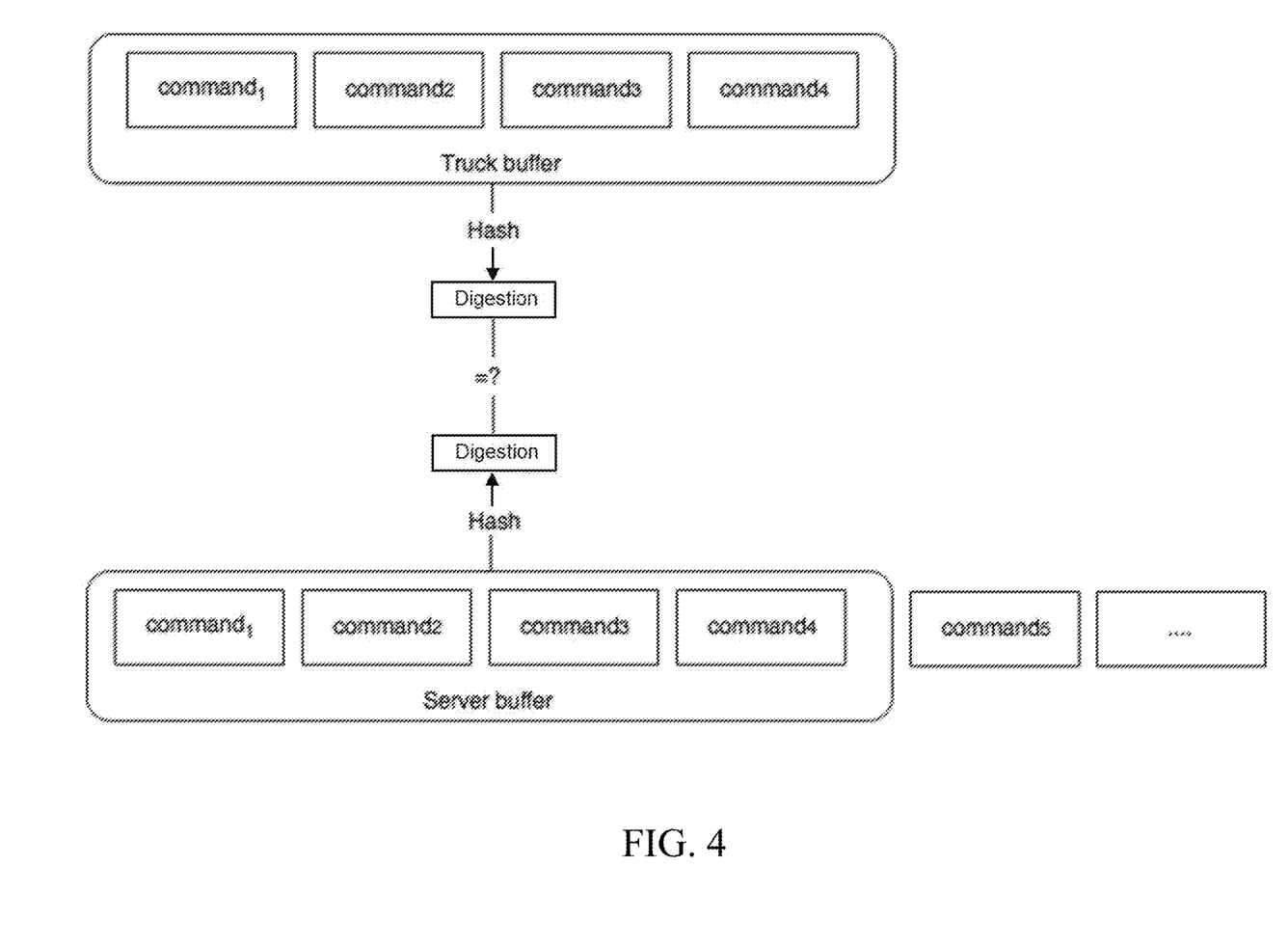
FIG. 4 shows a block diagram of an exemplary mechanism for ensuring the integrity of the remote monitor center and the vehicle in a real-time remote vehicular monitoring system.

FIG. 4 shows a block diagram of an exemplary mechanism for ensuring the integrity of communications between the remote monitor center and the vehicle in a real-time remote vehicular monitoring system. As shown in FIG. 4, and in some embodiments, the monitor server and the vehicle maintain a buffer of commands of the same size. In other embodiments, the buffers may be differently sized, but an identically sized portion is used to implement the command feedback validation process.

As control commands are sent and received, they are consecutively placed in the monitor server command buffer and vehicle command buffer, respectively. When the buffers are full, a cryptographic hash of the buffer is computed to generate a message digest. The message digest from the vehicle is received, and then compared to the message digest generated at the monitor server. If the hashes of the two message digests are not equal, an indicator of a security breach is generated and the EHS is triggered.

In some embodiments, any one-way function may be used to implement command feedback validation. A one-way function is a function that is easy to on every input, but is hard to invert given the image of a random input (where "easy" and "hard" are understood in the sense of computational complexity theory).

In various embodiments, the cryptographic hash function may be computed on different types of inputs. For example, the input may be a fixed number control commands. In another example, the input may be the control commands in a sliding time-window. In yet another example, the input may be control commands that have been flagged with a specific tag by the remote monitor server (or the vehicle itself). In yet another example, the input may be control commands that are directed to a specific subsystem or subcomponent of the vehicle. In yet another example, a combination of the different methods described may be employed.

Resilience Against Attack Scenarios

The security architecture disclosed in this document is resilient to various types of attack scenarios based on the amalgamation of the described components.

Eavesdropping, tampering: The use of the IPsec protocol on the operational channel and SSL/TLS on the emergency channel precludes an attacker learning any knowledge from an eavesdropped packet due to the inherent security advantages of these protocols. The command feedback validation process, for example, will be able to detect any attempt at tampering.

Command injection: In an example and in order to inject a malicious command, an attacker must either impersonate the server or replay command messages. The impersonation of the monitor server is defended by IPsec authentication, and the replaying of commands is countered by the IPsec anti-replay protocol. With regard to command injection from unexpected channels, the command feedback validation process protects against this scenario.

Jamming: Jamming attacks may compromise the availability of the communication channels and/or GPS signals. Upon detecting a jamming attack, the EHS is triggered.

Cryptographic attacks: The use of current IPsec and SSL/TLS protocol implementations (that typically use 256-bit or higher strength keys, etc.) preclude the success of a cryptographic attack on the real-time remote vehicular monitoring system.

Figure 5:
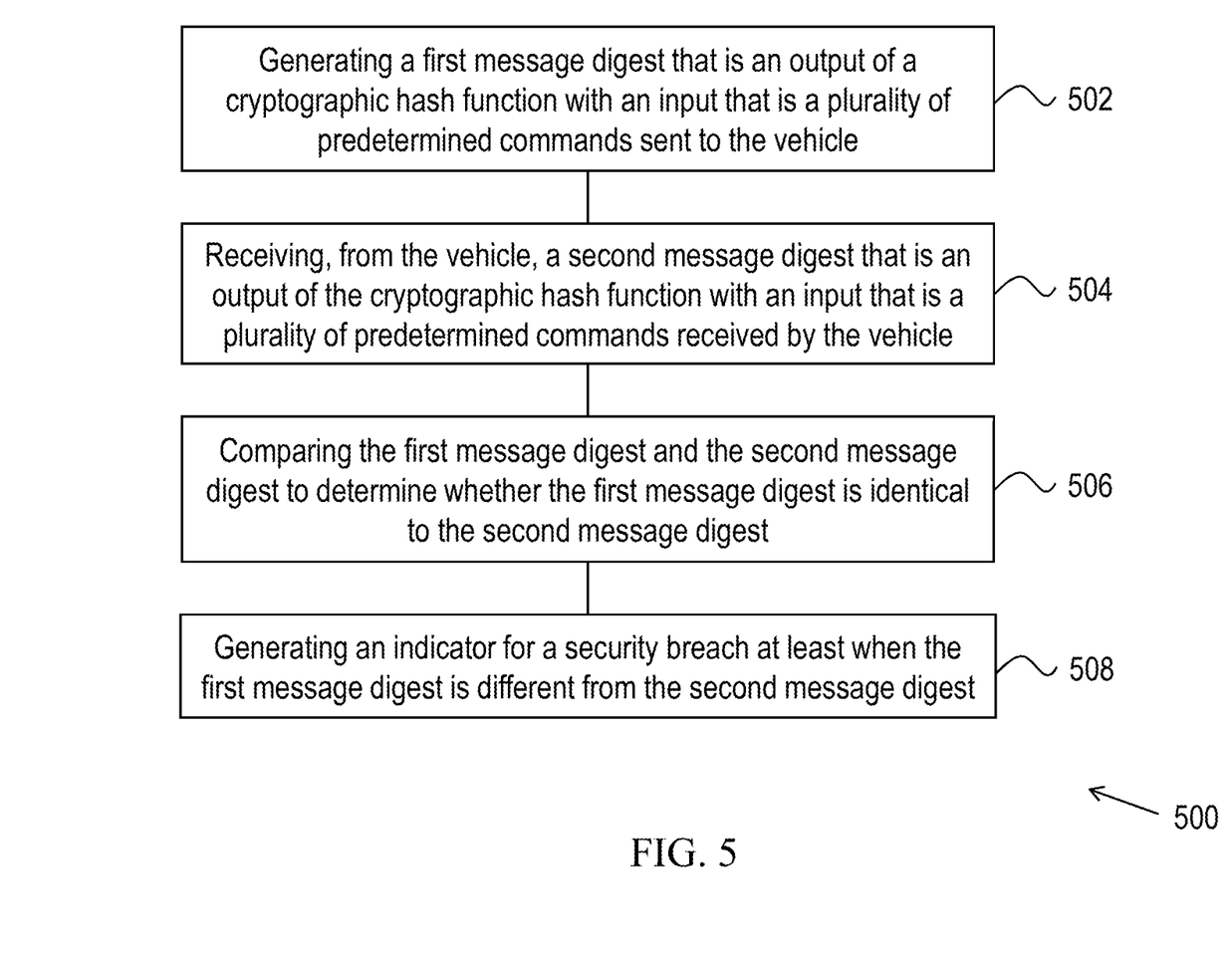
FIG. 5 shows a flowchart of an example method for providing security for a real-time remote vehicular monitoring system.

FIG. 5 shows a flowchart of an example method 500 that may be implemented at a remote monitor center for securing wireless communications between the remote monitor center and the vehicle. The method 500 includes, at step 502, generating a first message digest that is an output of a cryptographic hash function with an input that is a plurality of predetermined commands sent to the vehicle. In some embodiments, the plurality of predetermined commands send to the vehicle is stored in a command buffer at the remote monitor center, and the message digest is generated when the command buffer is full. In other embodiments, the cryptographic hash function used may be SHA-1, SHA-2, or the MD5 algorithm, or any one-way function.

In some embodiments, the plurality of predetermined commands may include only those commands that have a certain priority, or flagged by the remote monitor center, or more generally, be of a specific type. In other embodiments, the predetermined commands may be the most recent set of control commands transmitted by the remote monitor center. In yet other embodiments, the predetermined commands may include commands destined for a specific subcomponent or subsystem in the vehicle.

The method 500 includes, at step 504, receiving, from the vehicle, a second message digest that is an output of the cryptographic hash function with an input that is a plurality of predetermined commands received by the vehicle. In some embodiments, the message digest from the vehicle may be received over the emergency channel, which may be a satellite link. In other embodiments, the satellite link is secured using a low-latency cryptographic protocol, e.g. SSL/TLS. In other embodiments, the plurality of predetermined commands received by the vehicle are stored in a remote command buffer in the vehicle.

The method 500 includes, at step 506, comparing the first message digest and the second message digest to determine whether the first message digest is identical to the second message digest.

The method 500 includes, at step 508, generating an indicator for a security breach at least when the first message digest is different from the second message digest. In some embodiments, the EHS system is triggered when the security breach indicator is generated. In other embodiments, the EHS system may include an EHR that includes requesting, and subsequently receiving, geolocation information from the vehicle, and then, transmitting one or more control commands to navigate the vehicle to a safe location. In an example, the geolocation information and the control commands may be transmitted on the emergency channel. In another example, the geolocation information may be sent from the vehicle over the operational channel, and the control commands sent from the remote monitor center over the emergency channel.

In some embodiments, an indicator for a security breach is generated when the generated and received message digests are different. In other embodiments, the indicator may be generated based on other factors, including detection of malicious control commands being received, the detection of jamming signals, etc.

Figure 6:
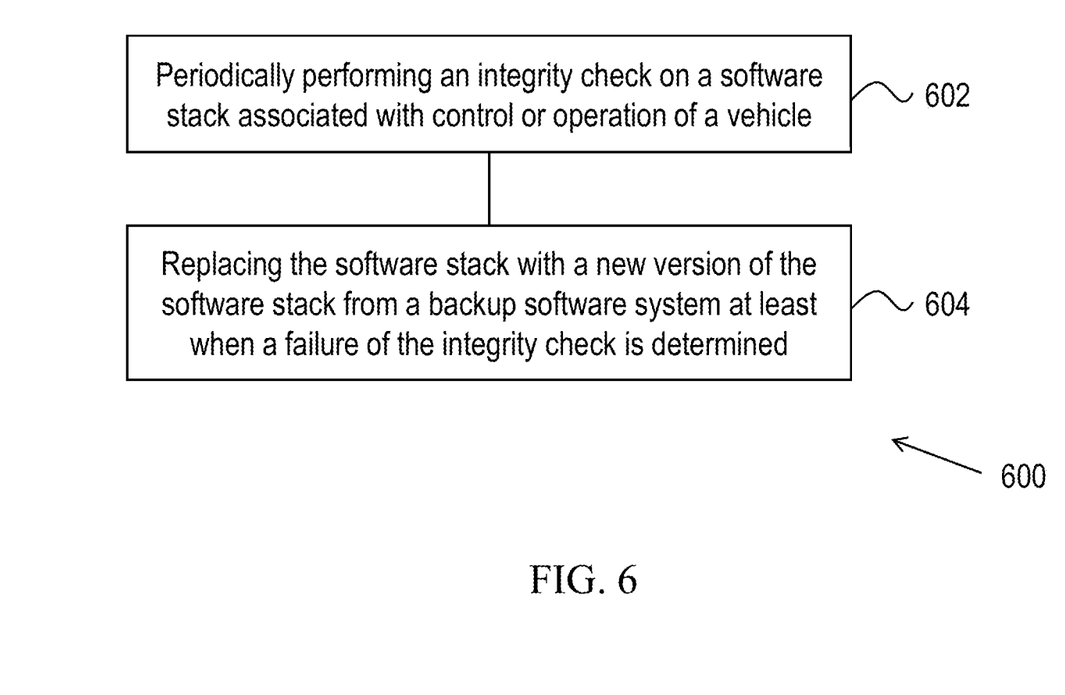
FIG. 6 shows a flowchart for another example method for providing security for a real-time remote vehicular monitoring system.

FIG. 6 shows a flowchart of an example method 600 that may be implemented at a vehicle or a remote monitor center for securing wireless communications between the remote monitor center and the vehicle. The method 600 includes, at step 602, periodically performing an integrity check on a software stack associated with control or operation of a vehicle.

In some embodiments, the integrity check may include determining whether a position, velocity or acceleration of a vehicle is within a pre-determined acceptable operating range. In an example, the pre-determined acceptable operating range may be based on a location of the vehicle, e.g. a speed limit is used to determine the operating range for the velocity.

In other embodiments, the integrity check may include determining whether data from one or more vehicular sensors are within a pre-determined acceptable operating range. In an example, a LIDAR (Light Detection And Ranging) sensor may indicate that the vehicle is too close to the vehicle in front of it, and a deceleration procedure may be invoked. In another example, a temperature sensor may provide a reading of greater than 300° F., in which case the hypervisor will recognize that the temperature sensor may be faulty (based on independent location data, for example), and the temperature sensor data will be discarded and that sensor will not be used until it can be serviced or replaced.

The method 600 includes, at step 604, replacing the software stack with a new version of the software stack from a backup software system at least when a failure of the integrity check is determined. In some embodiments, the replication strategy described in this document enables both the vehicle and the remote monitor center to replace a software and/or hardware system that has failed an integrity check. In other embodiments, the software stack may be replaced with a new version if an updated version or other software updates have been made available.

Figure 7:
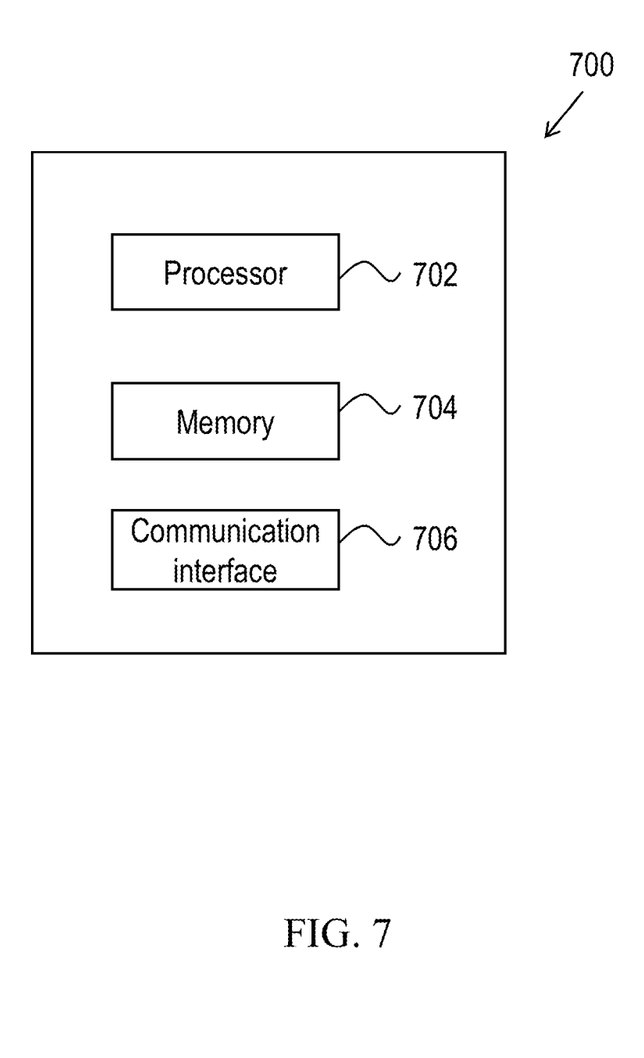
FIG. 7 shows an example of a hardware platform that can implement some techniques described in the present document.

FIG. 7 shows an example of a hardware platform 700 that can be used to implement some of the techniques described in the present document. For example, the hardware platform 700 may implement the methods 500 or 600, or may implement the various modules described herein. The hardware platform 700 may include a processor 702 that can execute code to implement a method. The hardware platform 700 may include a memory 704 that may be used to store processor-executable code and/or store data. The hardware platform 700 may further include a communication interface 706. For example, the communication interface 706 may implement one or more of the communication protocols (LTE, Wi-Fi, and so on) described herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A method of providing security for a vehicular monitoring system, implemented at a remote monitor center that remotely monitors a vehicle via a wireless communication, the method comprising:
    generating a first message digest that is an output of a cryptographic hash function performed on an input that is a plurality of predetermined commands, wherein the plurality of predetermined commands are sent to the vehicle;
    receiving, from the vehicle, a second message digest that is another output of the cryptographic hash function performed on another input that is a set of predetermined commands, wherein the set of predetermined commands are received by the vehicle;
    comparing the first message digest and the second message digest to determine whether the first message digest is identical to the second message digest; and
    generating an indicator for a security breach at least when the first message digest is different from the second message digest.

2. The method of claim 1, wherein the second message digest is received from the vehicle over an emergency channel that is dedicated for communications for handling an emergency.

3. The method of claim 2, wherein the emergency channel comprises a satellite link and is secured using a low-latency cryptographic protocol.

4. The method of claim 1, wherein the plurality of predetermined commands sent to the vehicle are stored in a local command buffer in the remote monitor center.

5. The method of claim 4, wherein the first message digest is generated when the local command buffer is full.

6. The method of claim 1, wherein the set of predetermined commands received by the vehicle are stored in a remote command buffer in the vehicle.

7. The method of claim 1, wherein the indicator of the security breach is associated with a communication or an operation of the vehicle.

8. The method of claim 1, further comprising:
    triggering an emergency handling service at least when the indicator for the security breach is generated, wherein the emergency handling service comprises:
    receiving geolocation information from the vehicle; and
    transmitting one or more commands to navigate the vehicle to a safe location when the geolocation information is received.

9. The method of claim 1, wherein the plurality of predetermined commands sent to the vehicle comprises a set of recently transmitted commands.

10. The method of claim 1, wherein the set of predetermined commands received by the vehicle comprises commands that have been flagged by the remote monitor center.

11. The method of claim 1, wherein the set of predetermined commands received by the vehicle comprises commands directed to a subsystem of the vehicle.

12. An apparatus comprising a processor that when configured causes the apparatus to:
    generate a first message digest that is an output of a cryptographic hash function performed on an input that is a plurality of predetermined commands, wherein the plurality of predetermined commands are sent to a vehicle;

receive, from the vehicle, a second message digest that is another output of the cryptographic hash function performed on another input that is a set of predetermined commands, wherein the set of predetermined commands are received by the vehicle;

compare the first message digest and the second message digest to determine whether the first message digest is identical to the second message digest; and generate an indicator for a security breach at least when the first message digest is different from the second message digest.

13. The apparatus of claim 12, wherein the second message digest is received from the vehicle over an emergency channel that is dedicated for communications for handling an emergency.

14. The apparatus of claim 13, wherein the emergency channel comprises a satellite link and is secured using a low-latency cryptographic protocol.

15. The apparatus of claim 12, wherein the plurality of predetermined commands sent to the vehicle are stored in a local command buffer in a remote monitor center.

16. The apparatus of claim 15, wherein the first message digest is generated when the local command buffer is full.

17. The apparatus of claim 12, wherein the set of predetermined commands received by the vehicle are stored in a remote command buffer in the vehicle.

18. The apparatus of claim 12, wherein the indicator of the security breach is associated with a communication or an operation of the vehicle.

19. The apparatus of claim 12, wherein the processor is further configured to cause the apparatus to:

trigger an emergency handling service at least when the indicator for the security breach is generated, wherein the emergency handling service comprises:

receive geolocation information from the vehicle; and transmit one or more commands to navigate the vehicle to a safe location when the geolocation information is received.

20. The apparatus of claim 12, wherein the plurality of predetermined commands sent to the vehicle comprises a set of recently transmitted commands.

* * * * *